(12) United States Patent
Lloyd

(10) Patent No.: US 7,195,204 B2
(45) Date of Patent: *Mar. 27, 2007

(54) HIGH ALTITUDE PLATFORM CONTROL SYSTEM

(75) Inventor: David W. Lloyd, Manhattan Beach, CA (US)

(73) Assignee: The DirecTV Group, Inc., El Segundo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/144,976

(22) Filed: Jun. 3, 2005

(65) Prior Publication Data

US 2006/0022089 A1 Feb. 2, 2006

Related U.S. Application Data

(60) Division of application No. 10/464,950, filed on Jun. 18, 2003, now Pat. No. 6,929,220, which is a continuation of application No. 10/253,979, filed on Sep. 23, 2002, now Pat. No. 6,631,871, which is a continuation of application No. 09/644,226, filed on Aug. 21, 2000, now Pat. No. 6,513,758.

(51) Int. Cl.
 *B64C 1/00* (2006.01)
(52) U.S. Cl. .................................. 244/129.1
(58) Field of Classification Search ............ 244/129.1, 244/76 R; 342/354, 359; 343/713, 706, 343/705

See application file for complete search history.

(56) References Cited

U.S. PATENT DOCUMENTS

| 5,790,071 | A | 8/1998 | Silverstein et al. |
|---|---|---|---|
| 5,912,642 | A | 6/1999 | Coffin et al. |
| 6,014,372 | A | 1/2000 | Kent et al. |
| 6,150,977 | A | 11/2000 | Wilcoxson |
| 6,285,338 | B1 | 9/2001 | Bai et al. |
| 6,513,758 | B1 | 2/2003 | Lloyd |
| 6,631,871 | B2 | 10/2003 | Lloyd |

OTHER PUBLICATIONS

Oodo, M. et al. "Onboard DBF Antenna for Stratospheric Platform", 2000 IEEE, International Conference on Phased Array Systems and Technology, Proceedings, May 21-25, 2000, pp. 125-128.

Yokosuka Research Park, "The First Stratospheric Platform Systems Workshop", May 12-13, 1999, pp. 1-216.

Chan, K.K. et al. "A Circularly Polarized Waveguide Array for Leo Satellite Communications", Antennas and Propagation Society, 1999, IEEE International Symposium, vol. 1, 22-16, Jul. 1999, pp. 154-157.

*Primary Examiner*—Michael J Carone
*Assistant Examiner*—John A Radi
(74) *Attorney, Agent, or Firm*—Georgann S. Grunebach

(57) ABSTRACT

A method and system for controlling a movable appendage on an aerospace vehicle independent from the position of the aerospace vehicle. First and second beacons containing actual position information for the movable appendage are tracked and acquired by first and second beacon tracking sites. The beacon tracking sites report the azimuth and elevation data relating to the position of the movable appendage to a processor where a correction command is determined based on an error calculated from the position data and a desired position. The correction command is communicated to the movable appendage so that appropriate correction to the desired position can be made.

11 Claims, 2 Drawing Sheets

HIGH ALTITUDE PLATFORM CONTROL SYSTEM

CROSS-REFERENCE TO RELATED PATENT APPLICATION

This application is a divisional of U.S. patent application bearing Ser. No. 10/464,950, filed Jun. 18, 2003 now U.S. Pat. No. 6,929,220; which is a continuation of Ser. No. 10/253,979, filed Sep. 23, 2002, now issued as U.S. Pat. No. 6,631,871 on Oct. 14, 2003; which is a continuation of Ser. No. 09/644,226, filed Aug. 21, 2000, entitled "High Altitude Platform Control System", inventor: David W. Lloyd, now issued as U.S. Pat. No. 6,513,758, on Feb. 4, 2003; the entire contents of all applications are incorporated herein by this reference.

TECHNICAL FIELD

The present invention relates generally to a movable platform or appendage as on an air or space vehicle, and more particularly to a movable platform or appendage that needs to be accurately controlled.

BACKGROUND ART

A reliable communications system depends heavily on the accurate position control of movable platforms or appendages, such as antennas. These movable devices can be mounted on an air or space vehicle, or may be part of a terrestrial system such as an electronically-steered phased array antenna.

In order to provide reliable service, the movable devices must be maintained in certain predetermined, or fixed, positions. This is especially important in air and space vehicles, which are constantly moving and require certain movable devices to maintain relative positions regardless of the motion of the vehicle.

There is a need for a low-cost reliable method of controlling a movable device such as a gimbaled communications platform attached to an unmanned aerospace vehicle.

SUMMARY OF THE INVENTION

It is an object of the present invention to improve the reliability of a communications system. It is another object of the present invention to provide a simple low-cost method for accurately controlling a movable appendage.

It is a further object of the present invention to provide a closed-loop control system for a movable appendage. It is still a further object of the present invention to track the actual position of the device to be controlled and position the device to a desired position.

In carrying out the above objects, the present invention provides a closed-loop control system. Downlink beacons sent from the device being controlled are received by tracking sites on the ground and track the movement of the device. The tracking sites report the device's position information to a computer processor. The processor computes an error that is representative of the actual position of the device from the desired position of the device to be controlled. The computer processor computes a command that is sent back to the device to be controlled to null the error and drive the controlled device to the desired position.

These and other features of the present invention will be better understood with regard to the following description, appended claims, and accompanying drawings.

BEST MODE FOR CARRYING OUT THE INVENTION

Figure 1:
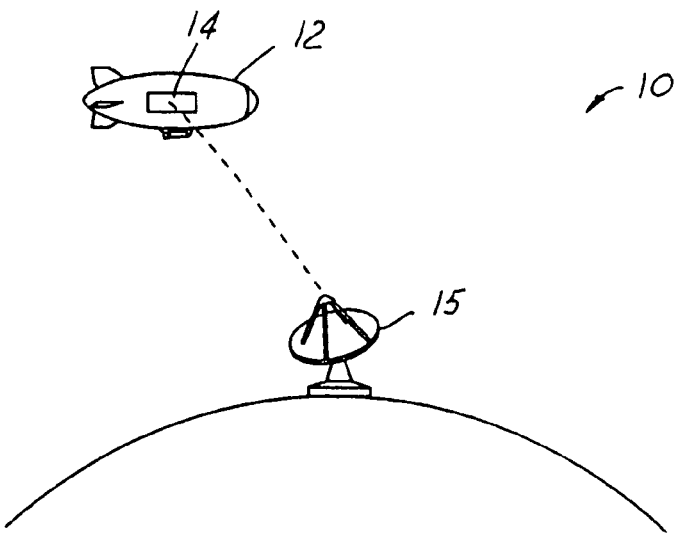
FIG. 1 is an illustration of a communications system that may employ the control system of the present invention.

Referring to FIG. 1 there is shown a communications system 10 that employs a stratospheric aircraft 12 having a movable platform 14. It should be noted that while a stratospheric aircraft and a movable platform are being illustrated and described with reference to the present invention herein, it is possible to apply the control system to other applications as well. For example, the present invention is applicable to any unmanned aerospace vehicle, such as a satellite and any movable device such as an antenna.

Referring still to FIG. 1, the stratospheric aircraft 12 flies in a fixed pattern while the communications platform 14 provides communications service to and from ground based users 15. To provide the service, the communications platform 14 must remain in a fixed position, in three axes, with respect to the ground. The fixed position of the platform 14 is independent of the aircraft's motion.

Figure 2:
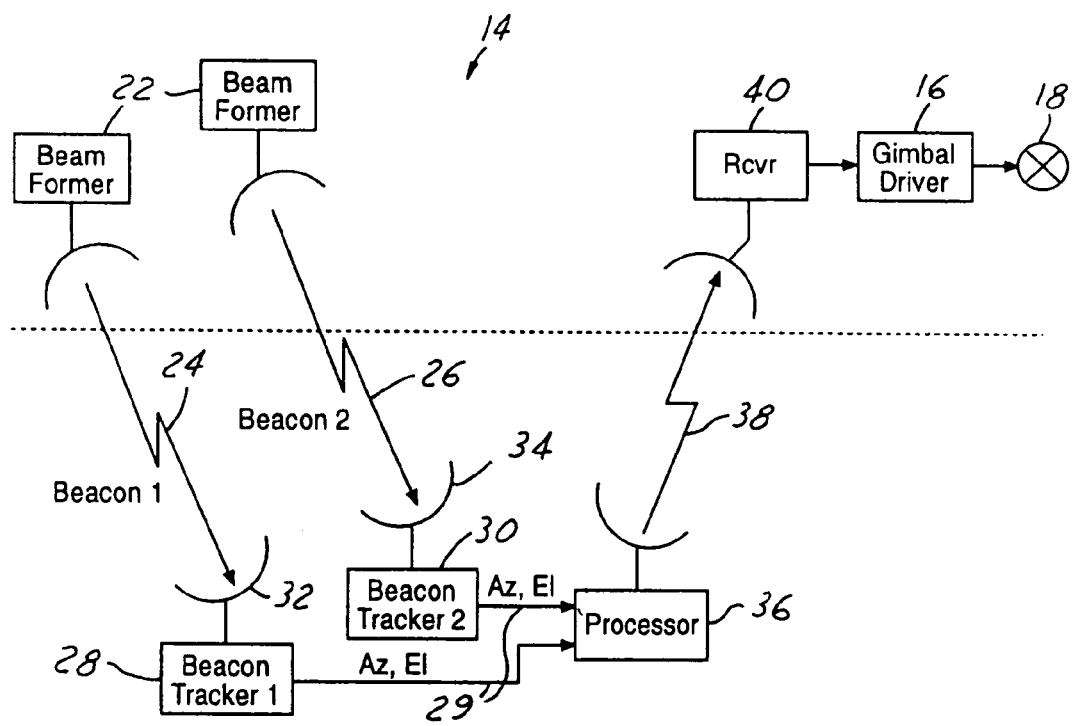
FIG. 2 is a block diagram of the control system of the present invention.

Referring now to FIG. 2 there is shown a block diagram of a stratospheric aircraft platform 14 and a closed-loop control system 20 according to the present invention. The platform 14 has a gimbal driver 16 and three-axis gimbal control 18.

The platform 14 includes a beam former 22 that allocates two beams as first and second downlink beacons 24 and 26. The downlink beacons 24 and 26 are tracked by two beacon tracking sites 28 and 30 on the ground. The platform 14 for a stratospheric aircraft has beam-forming capability 22 as part of its communications service. Therefore, there is no additional complexity required to generate the first and second tracking beacons 24 and 26 on board.

Figure 3:
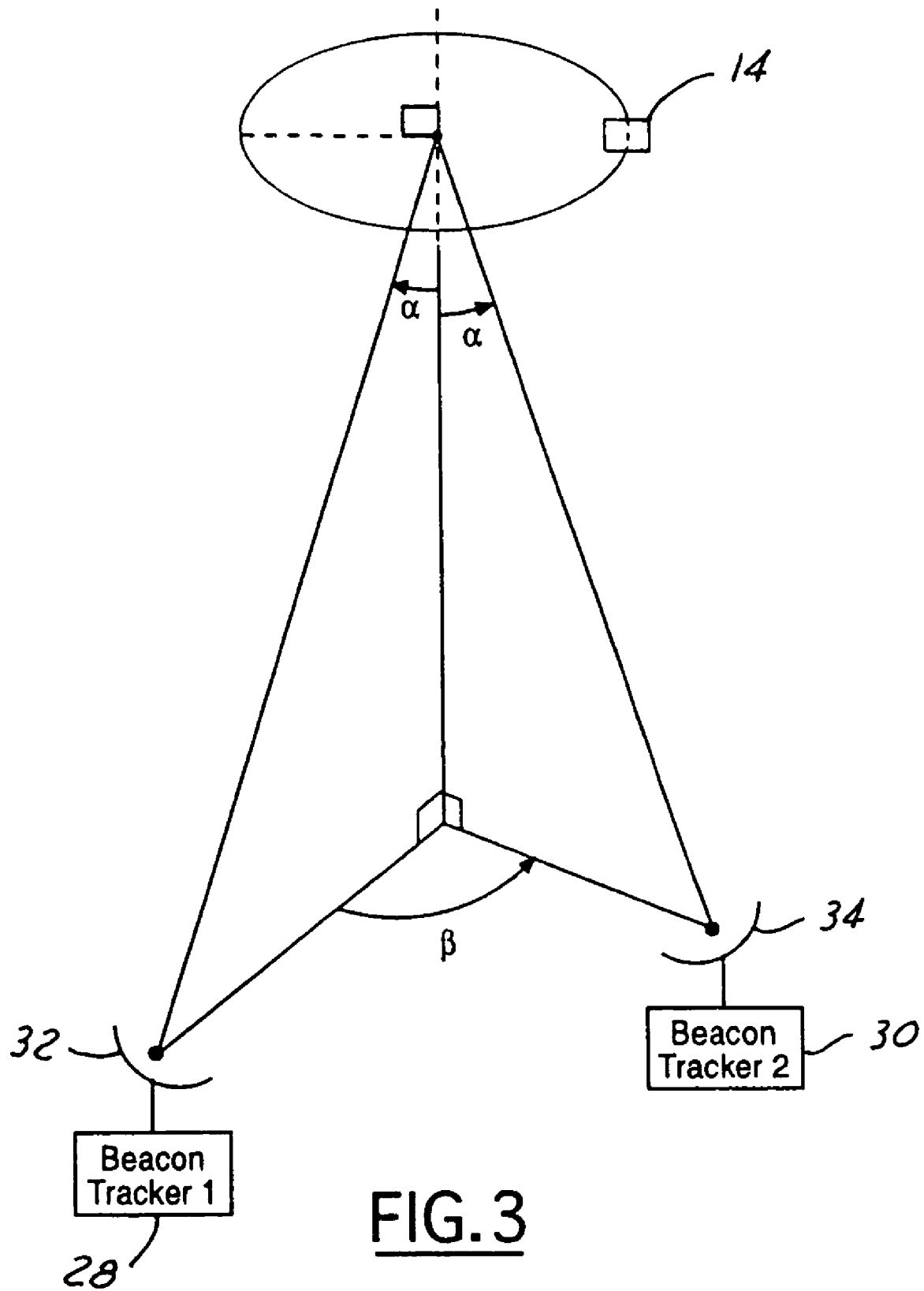
FIG. 3 is a diagram illustrating the positioning for the ground-based tracking sites.

The tracking sites 28 and 30 are geographically located to provide optimal geometry for the control system. The tracking sites 28 and 30 are positioned with a predetermined distance between them in order to enhance the accuracy of the present invention. For example, according to one embodiment of the present invention, the tracking sites are positioned as shown in FIG. 3, where the angle $\alpha$ between the nominal boresight of the tracking station's antenna 32 and 34 and the nominal nadir axis of the platform 14 is a minimum of five degrees, and the angular separation $\beta$ between the first tracking site 28 and the second tracking site 30 is approximately ninety degrees.

Referring again to FIG. 2, the tracking sites 28 and 30 have a gimbaled antenna 32 and 34 in order to acquire and track the downlink beacons 24 and 26. Each tracking site 28 and 30 reports azimuth and elevation data of the platform 14 to a ground based processor 36. The tracking sites 28 and 30 can report data to the processor 36 by way of terrestrial links 29. This allows the sites 28 and 30 to be optimally located and allows the processor 36 to be collocated with other centralized network facilities (not shown).

The processor 36 computes any errors between the actual position of the platform 14 and the desired position of the platform 14. The processor 36 then calculates the commands 38 necessary to null the errors. The commands 38 are transmitted to a receiver 40 where they are sent to the gimbal driver 16, which drives the gimbal 18 thereby adjusting the platform 14 to the desired position.

The present invention does not require any information from the aircraft itself. For example, the position, attitude, rate, etc. of the aircraft are irrelevant to the control system of the present invention. This simplifies the aircraft/platform interface, which can reduce the cost of the overall flight system.

Additionally, it is not necessary to perform attitude control processing on board the platform. All of the processing can be done on the ground utilizing a low cost commercial computer. This significantly reduces the platform weight and complexity, which ultimately reduces the platform cost. Also, because all of the attitude control processing is done on the ground at the processor 38 instead of on the platform 14, software maintenance is simplified and any modifications and upgrades to the software are easier to perform.

The downlink beacons 24 and 26 provide position feedback. Therefore, there is no need for gyroscopes and attitude sensors on the platform. Nor is there a need for a resolver or other position feedback device on the platform gimbal.

Typically in aerospace applications, uplink beacon tracking designs require beacon tracking arrays, solid-state modular assemblies, and tracking receivers on board the platform. None of this hardware is required for the present invention.

It is noted that the present invention may be used in a wide variety of different implementations encompassing many alternatives, modifications, and variations, which are apparent to those with ordinary skill in the art. Accordingly, the present invention is intended to embrace all such alternatives, modifications and variations that fall within the spirit and scope of the appended claims.

What is claimed is:

1. A stratospheric platform communications system having beam forming capability, said system comprising: a stratospheric aircraft; first and second downlink beacons generated by said beam forming capability, said first and second downlink beacons having actual position information; a first tracking site for acquiring and tracking said first downlink beacon said first tracking site having a first gimbaled antenna; a second tracking site spaced a predetermined distance from said first tracking site, said second tracking site for acquiring and tracking said second downlink beacon, the second tracking site having a second gimbaled antenna; said first and second tracking sites respectively generating a first set of azimuth and elevation data relative to tracking the first beacon with the first gimbaled antenna and a second set of azimuth and elevation data relative to tracking the second beacon with the second gimbaled antenna; and a processor in communication with said first and secord tracking sites and said stratospheric aircraft, said processor receiving said first set of azimuth and elevation data and said second set of azimuth and elevation data from said first and second tracking sites to calculate an error between said actual position and a desired position from said first set of azimuth and elevation data and said second set of azimuth and elevation data, said error being used by said processor to calculate a correction command that is sent to said stratospheric aircraft.

2. The system as claimed in claim 1 further comprising said first and second tracking sites being spaced 90 degrees from each other.

3. The system as claimed in claim 1 wherein said processor is located on the ground and communicates by way of terrestrial links between said processor and said first and second tracking sites.

4. The system as claimed in claim 1 wherein said first and second tracking sites are positioned with a predetermined distance therebetween.

5. The system as claimed in claim 1 further comprising a firm downlink terrestrial link coupling the first tracking site and the processor and a second terrestrial link coupling the second tracking site and the processor, wherein said first and second beacon tracking sites and said processor are on the ground, and wherein said processor receives the sad first set of azimuth and elevation data by way of the first terrestrial link and said second set of azinnih and elevation data by way of the second terrestrial link.

6. The system as claimed in claim 1 wherein said platform is an unmanned aerospace vehicle.

7. A closed-loop control method for a movable platform, comprising:

generating first and second beacons on-board the movable platform; acquiring and tracking the first and second beacons respectively using first and second beacon tracking sites, said first beacon tracking site having a first gimbaled antenna and the second beacon tracking site having a second gimbaled antenna; with said first and second tracking sites respectively, generating a first set of azimuth and elevation data relative to tracking the first beacon with the first gimbaled antenna and a second set of azimuth and elevation data relative to tracking the second beacon with the second gimbaled antenna; transmitting the first set of azimuth and elevation data relative to tracking the first beacon with the first gimbaled antenna and the second set of azimuth and elevation data relative to tracking the second beacon with the second gimbaled antenna from the first and second beacon tracking sites to a processor, computing, in the processor. any errors between the actual position of the movable platform and a desired position of the movable platform using the first set of azimuth and elevation data relative to tracking the first beacon with the first gimbaled antenna and the second set of azimuth and elevation data relative to tracking the second beacon with the second gimbaled antenna; generating commands necessary to null the errors, and move the movable platform to the desired position, and transmitting the commands from the processor to the moveable platform.

8. The method as claimed in claim 7. further comprising: receiving the commands from the processor, and adjusting the position of the movable platform.

9. The method as claimed in claim 8, further comprising positioning said first and second beacon tracking sites with a predetermined distance therebetween on the ground.

10. The method as claimed in claim 9, wherein the angle .alpha. between a nominal boresight of antennas associated with the first and second beacon tracking sites and a nominal nadir axis of the movable platform is a minimum of at least about five degrees, and the angular separation between the first and second beacon tracking sites is approximately ninety degrees.

11. The method as claimed in claim 9, wherein the processor is ground-based and transmitting position data from the first and second beacon tracking sites to the processor comprises transmitting the position data by way of terrestrial links.

* * * * *